(12) United States Patent
Zhai et al.

(10) Patent No.: US 10,402,677 B2
(45) Date of Patent: Sep. 3, 2019

(54) HIERARCHICAL SHARPNESS EVALUATION

(71) Applicant: Apple Inc., Cupertino, CA (US)

(72) Inventors: Jiefu Zhai, San Jose, CA (US); Ke Zhang, San Jose, CA (US); Yunfei Zheng, Cupertino, CA (US); Shujie Liu, Cupertino, CA (US); Albert Keinath, Sunnyvale, CA (US); Xiaosong Zhou, Campbell, CA (US); Chris Chung, Sunnyvale, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 15/618,909

(22) Filed: Jun. 9, 2017

(65) Prior Publication Data

US 2017/0357871 A1     Dec. 14, 2017

Related U.S. Application Data

(60) Provisional application No. 62/348,576, filed on Jun. 10, 2016.

(51) Int. Cl.
| G06K 9/00 | (2006.01) |
| G06K 9/46 | (2006.01) |
| G06K 9/62 | (2006.01) |

(52) U.S. Cl.
CPC ............ *G06K 9/4642* (2013.01); *G06K 9/00* (2013.01); *G06K 9/00711* (2013.01); *G06K 9/6256* (2013.01); *G06K 9/6267* (2013.01)

(58) Field of Classification Search
None
See application file for complete search history.

(56) References Cited

U.S. PATENT DOCUMENTS

| 8,508,652 | B2 | 8/2013 | Albu et al. |
| 9,087,262 | B2 | 7/2015 | Chen et al. |
| 9,210,327 | B2 | 12/2015 | Aggarwal et al. |
| 2014/0355881 | A1 | 12/2014 | Bhardwaj et al. |
| 2015/0071547 | A1 | 3/2015 | Keating et al. |
| 2016/0048952 | A1* | 2/2016 | Tezaur ............... G06T 5/004 382/255 |

\* cited by examiner

*Primary Examiner* — Atiba O Fitzpatrick
(74) *Attorney, Agent, or Firm* — Baker & Hostetler LLP

(57) ABSTRACT

Techniques are disclosed for estimating quality of images in an automated fashion. According to these techniques, a source image may be downsampled to generate at least two downsampled images at different levels of downsampling. Blurriness of the images may be estimated starting with a most-heavily downsampled image. Blocks of a given image may be evaluated for blurriness and, when a block of a given image is estimated to be blurry, the block of the image and co-located blocks of higher resolution image(s) may be designated as blurry. Thereafter, a blurriness score may be calculated for the source image from the number of blocks of the source image designated as blurry.

22 Claims, 4 Drawing Sheets

100

200

300

600

HIERARCHICAL SHARPNESS EVALUATION

CLAIM FOR PRIORITY

The present application benefits from priority of U.S. application Ser. No. 62/348,576, filed on Jun. 10, 2016 and entitled "Hierarchical Sharpness Evaluation," the disclosure of which is incorporated herein by reference in its entirety.

BACKGROUND

The present disclosure relates to image processing techniques that detect blurriness in image content.

Modern consumer electronic devices include cameras and other video capturing devices. As a result, consumers find it convenient to create still images and video (collectively, "assets") at their whim. Assets can vary wildly in terms of the quality of image capture. And, since image capture and storage have become inexpensive, consumers have little incentive to purge assets with poor quality from their devices.

The proliferation of these devices, and the volume of image data that consumers generate, also make it difficult to organize assets in meaningful ways. And while automated tools have attempted to organize images in an automated fashion, such techniques typically rely on coarse categorization tools, such as time or date of capture, as a basis for organization. All too often, such tools identify poorly-composed media assets as key images, which are presented at the forefront of asset browsing tools.

The present disclosure describes techniques to remedy such disadvantages.

DETAILED DESCRIPTION

Embodiments of the present disclosure provide techniques for estimating quality of images in an automated fashion. According to these techniques, a source image may be downsampled to generate at least two downsampled images at different levels of downsampling. Blurriness of the images may be estimated starting with a most-heavily downsampled image. Blocks of a given image may be evaluated for blurriness and, when a block of a given image is estimated to be blurry, the block of the image and co-located blocks of higher resolution image(s) may be designated as blurry. Thereafter, a blurriness score may be calculated for the source image from the number of blocks of the source image designated as blurry.

Figure 1:
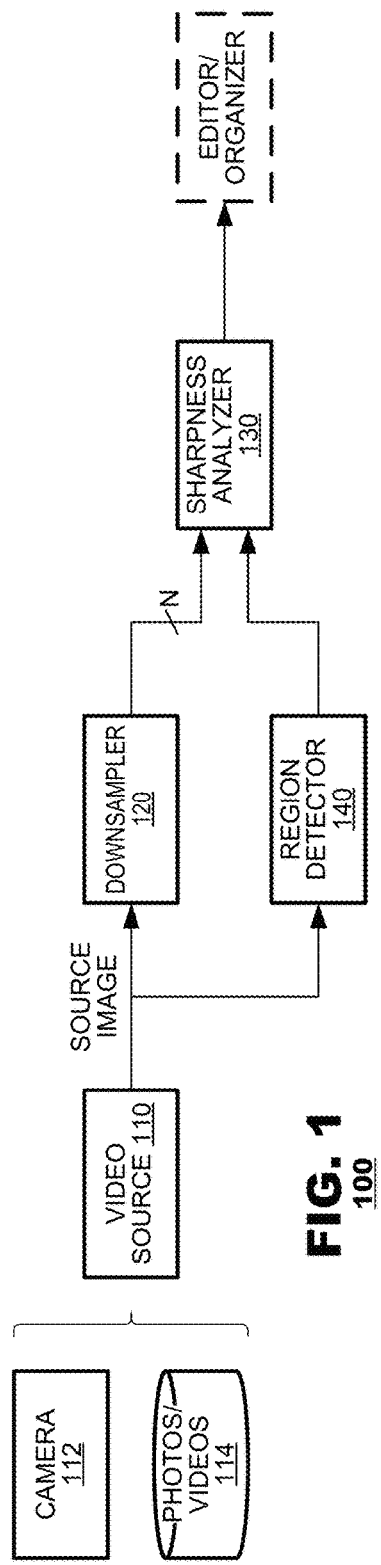
FIG. 1 is a simplified block diagram of an analytic system according to an embodiment of the present disclosure.

FIG. 1 is a simplified block diagram of an analytic system 100 according to an embodiment of the present disclosure. The system 100 may include a video source 110, a downsampler 120, and a sharpness analyzer 130. The video source 110 may provide source image(s) for analysis by the system 100. The downsampler 120 may generate several versions of the source image, each as different levels of downsampling. The sharpness analyzer 130 may estimate a degree of blur in the source image content, which may be provided to other system components, such as media editors, media organizers, and the like. Optionally, the system 100 may include a region detector 140 which may identify region(s) of interest from within source images.

The video source may provide still image data and/or video sequences to other components of the system 100. The video source 110 may be provided as a camera 112 that captures image data of a local environment and provides the captured images to the system 100. Alternatively, the video source 110 may be provided as storage device 114 that stores image data, for example, digital photos or videos, previously-created. The storage device 114 may provide the stored image data to the system 110. Although the primary application of the proposed techniques involves analysis of operator-captured image data, the techniques may be extended to analysis of source images that are computer-generated, for example, graphics data generated by gaming applications, as may be desired.

Figure 2:
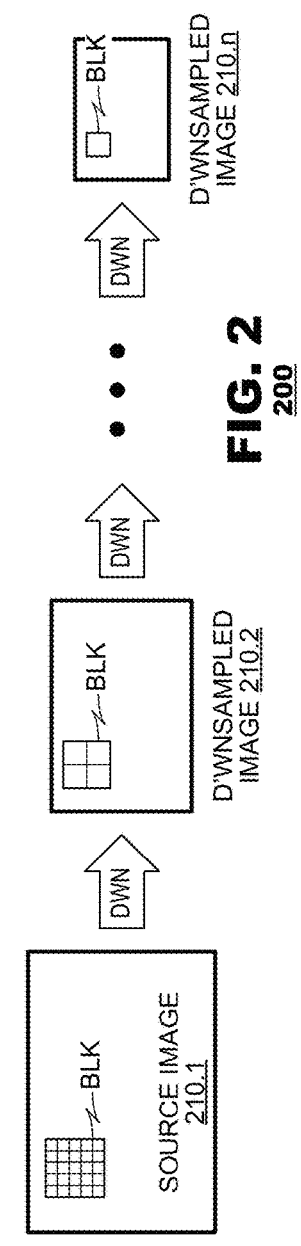
FIG. 2 illustrates an exemplary source image and multiple downsampled images that may be generated therefrom.

FIG. 2 illustrates an exemplary source image 210.1 and multiple downsampled images 210.2-210.$n$ that may be generated therefrom. Spatial downsampling may reduce the size of images in each stage of downsampling. Downsampling typically causes a pixel in a downsampled image (say, image 210.2) to be generated from a plurality of pixels in a larger image 210.1.

Downsampling 120 (FIG. 1) may occur in any of a number of ways. In a simple embodiment, an image (say, source image 210.1) may be downsampled to one quarter of its original size. In this case, 2×2 groups of pixels in the image 210.1 may be converted to a single pixel in a downsampled image 210.2, for example, by averaging content of the pixels in each 2×2 group. A next-downsampled image (not shown) also may be created by converting 2×2 groups of pixels in the first downsampled image 210.2 to a single pixel in the next downsampled image. A succession of downsampled images 210.1-210.$n$ may be created in this manner.

In other embodiments, downsampling 120 may occur by frequency domain analyses of images. Frequency-based transforms may be applied to a first image 210.1, which yield transform coefficients representing content of the image 210.1 at different frequencies. Downsampling may occur by discarding coefficients corresponding to select higher frequency coefficients, then transforming the remaining coefficients back to pixel domain representations. For example, a source image data 210.1 may be parsed in blocks of a given size (say, 16×16 blocks), and each block may be transformed by a discrete cosine transform to blocks of transform coefficients (a 16×16 array of coefficients). By discarding sufficient high-frequency coefficients from the blocks, altered blocks of different sizes may be created—12×12 blocks, 8×8 blocks or 6×6 blocks—which may yield downsampled images 210.2-210.$n$ at corresponding size reductions when the altered blocks are converted back to the pixel domain.

As indicated, a region detector 140 may identify region(s) of interest ("ROIs") from within source images. ROIs may be detected from predetermined types of image content such as human faces or other predetermined foreground objects. ROI regions may be assigned based on foreground/background discrimination processes, where foreground data is assigned to an ROI to the exclusion of background data.

Further, ROI regions may be assigned based on motion estimation of objects within image data; if for example, some objects have motion that deviates from a general direction of motion of the image data, those objects may be assigned to ROI regions to the exclusion of other image content where such motion does not appear.

Figure 3:
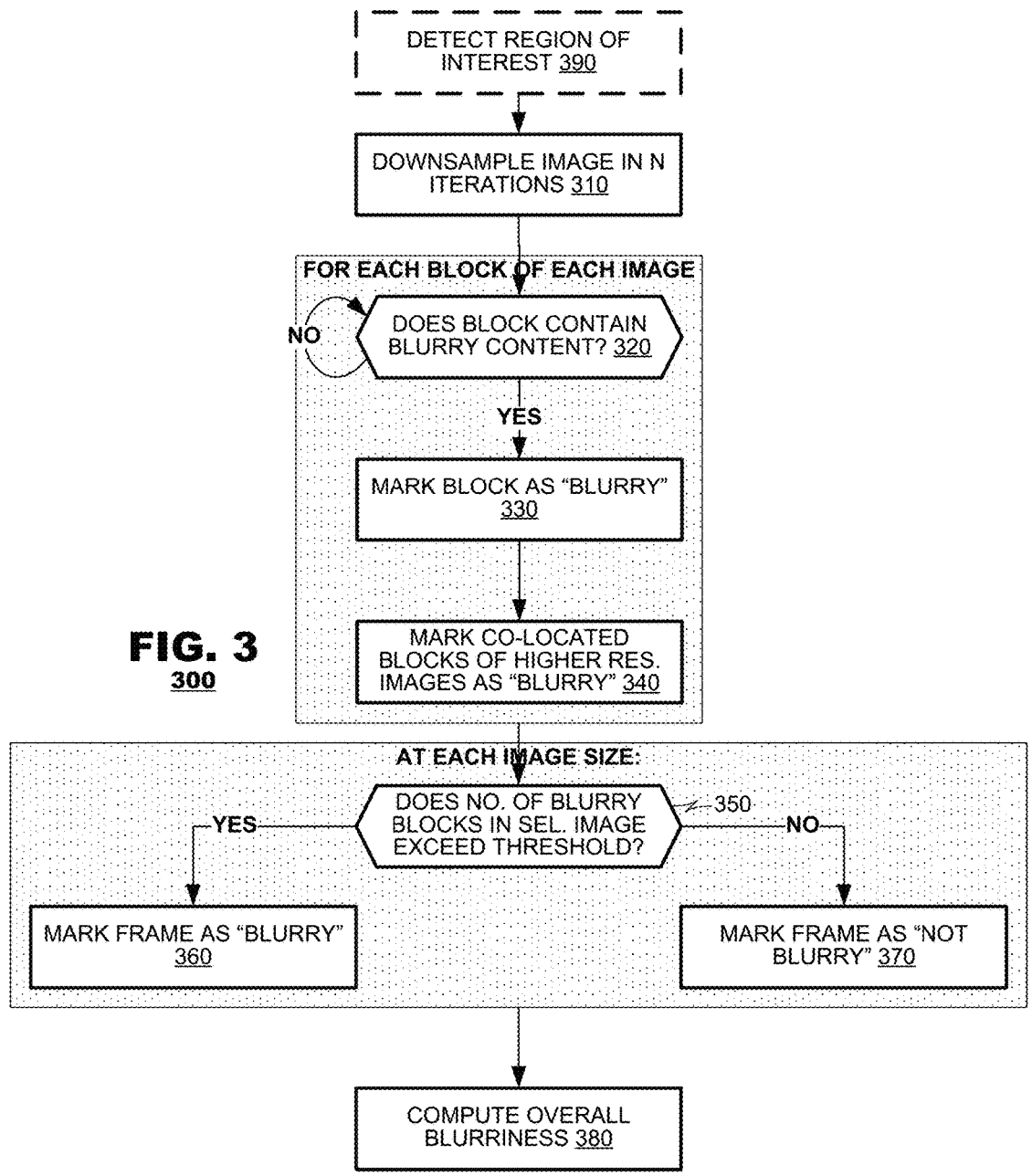
FIG. 3 illustrates a method according to an embodiment of the present disclosure.

FIG. 3 illustrates a method 300 according to an embodiment of the present disclosure. The method 300 may begin by downsampling input image data in several iterations (box 310) to produce several downsampled images. Starting with the most heavily downsampled image, the method 300 may analyze each block of each downsampled image to determine if the block contains blurry image content (box 320). If the block contains blurry image content, the method 300 may mark the block as "blurry" (box 330). In such a case, the method 300 also may mark co-located blocks of other, higher resolution images also as blurry (box 340).

After each downsampled image has been analyzed, the method 300 may determine whether the number of blocks marked as blurry in each image exceeds a predetermined threshold (box 350). If the number of blurry blocks exceeds the threshold, the method 300 may mark the frame as "blurry" (box 360). If the number of blurry blocks does not exceed the threshold, the frame may be marked as "not blurry" (box 370). An overall blurriness score may be computed from the "blurry"/"not blurry" designations applied to the various frames in boxes 360 and 370.

The method 300, therefore, may generate relative scores for a plurality of images which represent the amount of blur that is detected within the images.

Blurriness may be detected in a variety of ways. For example, blurriness may be detected by applying transforms to image data, such as Fourier transform, wavelet transform, or simply computing gradient and second-order partial derivatives. Analysis of content among the transformed coefficients may indicate blurriness. In another embodiment, blurriness may be detected as discussed in FIG. 4 hereinbelow.

Generally speaking, blur effects tend to be reduced as an image is downsampled. So, a source image with modest blur effects will tend to exhibit sharp image content after a relatively small number of downsampling operations are performed in sequence on the source image. By contrast, another source image with larger blur effects will continue to exhibit blurriness over a larger number of downsampling operations are performed in sequence on the other source image. When the method 300 is performed over a plurality of different source images, the method 300 is expected to provide a basis to quantify the amount of blur. Thus, it provides a basis to identify which source images in the plurality are blurrier than others.

In an embodiment, blur analysis may be performed differently in different spatial areas of image data. For example, image data may be analyzed to identify ROIs within the image data (box 390), and then the operations of boxes 320-380 may be confined to the spatial areas of the image data that contain the ROIs.

The techniques of FIG. 3 may be applied to still image data and video data alike. For video data, the overall blurriness score may be compiled across several frames of image data, rather than a single frame of image data as would occur for still image data.

Figure 4:
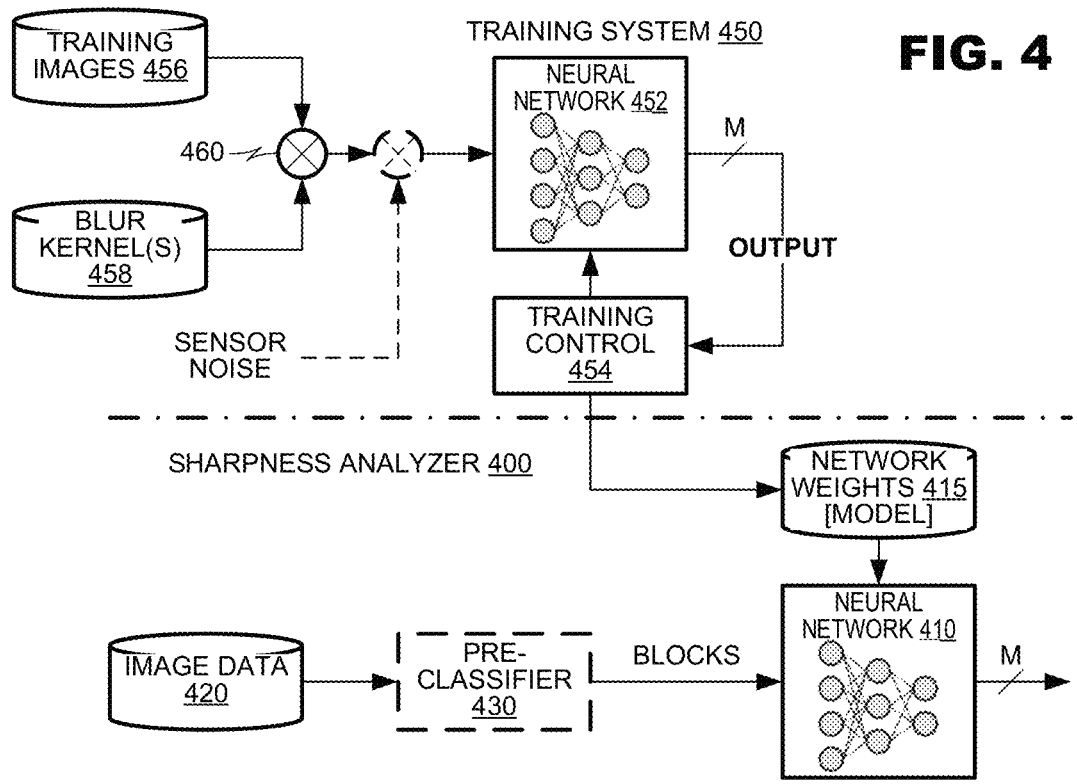
FIG. 4 illustrates a sharpness analyzer according to an embodiment of the present disclosure.

FIG. 4 illustrates a sharpness analyzer 400 that estimates blurriness of image data according to another embodiment of the present disclosure. The sharpness analyzer 400 may include a neural network 410, a source of input videos 420, and optionally, a pre-classifier 430. The neural network 410 may operate according to a set of network weights 415 that define behavior of the neural network 410.

During operation, image data may be parsed into blocks of predetermined size (say, 30×30 pixels) and each block may be input to the neural network 410. The neural network 410 may generate a multi-bit output that classifies the block according to a type of blur detected in the image content. For example, the blur may be classified according to the following types of blur:
  no blur (the image is determined not to be blurry);
  out-of-focus blur (blur effects are caused by changes in object depth within the block); and
  motion blur in any of a number of predetermined directions (e.g., horizontal blur, vertical blur, blur along various diagonal orientations).

The sharpness analyzer 400 may operate on image data such as the images output by the downsampler 120 (FIG. 1). Thus, the sharpness analyzer 400 may generate blur classifications for several representations of a single source image at various levels of downsampling.

A pre-classifier 430 may perform preprocessing of input blocks to determine if the input block is inappropriate for classification. For example, input blocks that are almost entirely homogeneous (example, a swath of blue sky) may not be appropriate for classification. The pre-classifier 430 may analyze input blocks to determine whether such blocks contain enough texture to be classified by the neural network 410. When an image blocks is classified as having insufficient texture, the system may mark the block as "undecided" and forego classification by the neural network 410.

As indicated, the neural network 410 may operate according to a set of network weights 415. The network weights 415 may be generated by a training system 450, which typically operates separately from a runtime implementation of the sharpness analyzer 400. Thus, the training system 450 may generate training weights 415 which may be imported to a device where the sharpness analyzer 400 is to operate.

FIG. 4 also illustrates a simplified block diagram of the training system 450. The training system 450 may include its own neural network 452, a controller 454, and databases of training images 456 and blur kernels 458. The training images database 456 may store block data representing sharp image data. The blur kernels 458 may store blur kernels of various types, each corresponding to a type of blur to which the neural network 452 is to be trained. For example, the kernels may include linear kernels of different directions, as well as other isotropic kernels, such as Gaussian kernels, to represent out-of-focus blur.

During operation, the neural network 452 may be trained to different types of blur. Individual blocks may be retrieved from the training images database 456, convolved with blur kernels from database 458 (represented by convolver 460), and input to the neural network 452. The controller 454 may analyze output from the neural network 452 in response to the input block and, if the output does not match the desired output (for example, if blur is not recognized or categorized incorrectly), network weights may be revised.

The neural network 452 may be trained iteratively with each combination of input block and blur kernel. The neural network 452 also is trained to recognize no blur events, using image blocks 456 without alteration by convolution. Eventually, when a set of network weights are defined that reliably yield correct categorization of the different blur events that are to be recognized, training is considered competed. The resultant network weights may be ported to the sharpness analyzer 400 for runtime use.

In an embodiment, training may occur with simulated sensor noise added to input image blocks.

Figure 5:
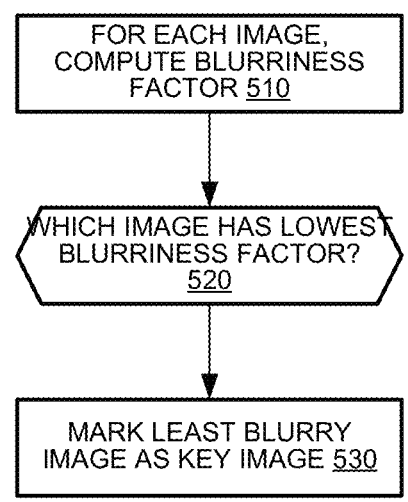
FIG. 5 illustrates a method according to another embodiment of the present disclosure.

FIG. 5 illustrates another method 500 according to an embodiment of the present disclosure. The method 500 may operate over a plurality of images. For each image in the plurality, the method 500 may compute a blurriness factor of the respective image (box 510). Blurriness factors may be computed, for example, according to the method 300 of FIG. 3 or by the sharpness analyzer of FIG. 4. Thereafter, the method 500 may identify which of the images in the plurality has the lowest blurriness factor (box 520). The method 500 may designate the frame identifies as having least blur as a key frame for the plurality.

The method 500 of FIG. 5 may be employed in a variety of applications. In a first use case, the method 500 may be performed on a plurality of images that form a video sequence. Thus, a least blurry image from the video sequence may be designated as a key frame, which may be used by asset browsing applications and the like as representative of image content within the video sequence.

In another user case, the method 500 may be performed on collections of image data captured as still images. Oftentimes, image capture devices operate according to processes that group images into collections based on time of image capture, based on location or based on other factors (for example, operator-supplied designations of events). The method 500 of FIG. 5 may be performed on such collections. Thus, a least blurry image from the collection may be designated as a key frame, which may be used by asset browsing applications and the like as representative of image content within the collection.

In a further application, blurriness scores may be applied based on classification rather than numerical scores. For example, blurriness scores may be applied according to tiers corresponding to estimations of low blur, medium blur, and high blur, respectively. In such an application, a least blurry image may be selected from a lowest tier of blur recognized by the application (low blur, in the foregoing example). When a plurality of images is identified by the method as corresponding to a common lowest tier of blur, all of them may be eligible for designation as a key frame. In one embodiment, an asset browsing application may cycle among the designated key frames when presenting image content representative of a collection. In another embodiment, an asset browsing application may use other factors (for example, brightness of a source image) when selecting among the eligible lowest blur images as a key frame.

Figure 6:
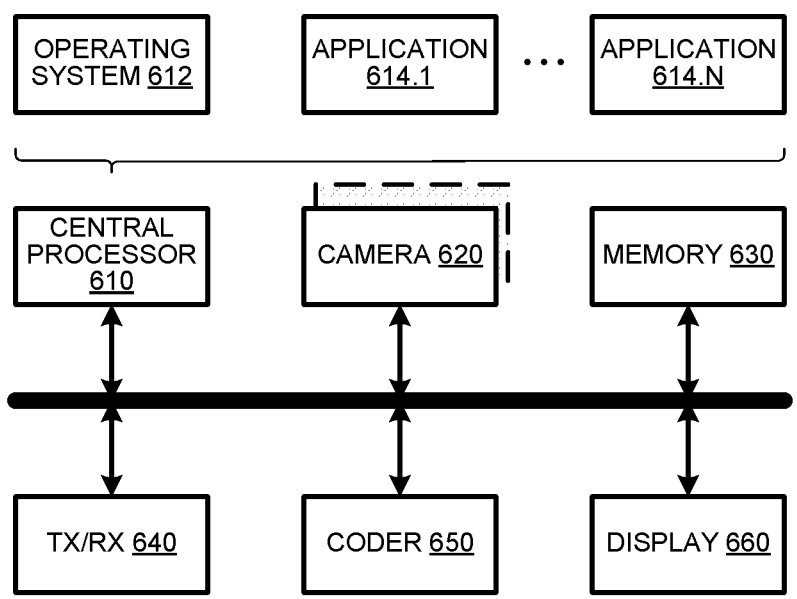
FIG. 6 illustrates an exemplary computer system suitable for use with embodiments of the present disclosure.

For example, the techniques described herein may be performed by a central processor of a computer system. FIG. 6 illustrates an exemplary computer system 600 that may perform such techniques. The computer system 600 may include a central processor 610, one or more cameras 620, a memory 630, and a transceiver 640 provided in communication with one another. The camera 620 may perform image capture and may store captured image data in the memory 630. Optionally, the device also may include sink components, such as a coder 650 and a display 660, as desired The central processor 610 may read and execute various program instructions stored in the memory 630 that define an operating system 612 of the system 600 and various applications 614.1-614.N. The program instructions may perform coding mode control according to the techniques described herein. As it executes those program instructions, the central processor 610 may read, from the memory 630, image data created either by the camera 620 or the applications 614.1-614.N, which may be processed according to the foregoing embodiments. The central processor 610 may execute an application 614.1 that performs the operations illustrated in the foregoing figures, including downsampling, sharpness evaluation, key frame designation and asset browsing.

As indicated, the memory 630 may store program instructions that, when executed, cause the processor to perform the techniques described hereinabove. The memory 630 may store the program instructions on electrical-, magnetic- and/or optically-based storage media.

The transceiver 640 may represent a communication system to transmit transmission units and receive acknowledgement messages from a network (not shown). In an embodiment where the central processor 610 operates a software-based video coder, the transceiver 640 may place data representing state of acknowledgment message in memory 630 to retrieval by the processor 610. In an embodiment where the system 600 has a coder 650, the coder may perform bandwidth compression on images or video and provide the compressed data to the transceiver 640 for delivery to other devices (also not shown) via the network.

Several embodiments of the present disclosure are specifically illustrated and described herein. However, it will be appreciated that modifications and variations of the present disclosure are covered by the above teachings and within the purview of the appended claims without departing from the spirit and intended scope of the invention.

We claim:

1. A method of estimating blurriness of a source image, captured by a camera or generated by a computer, comprising:
    downsampling the source image to generate at least two downsampled images at different levels of downsampling;
    parsing each downsampled images into a plurality of blocks;
    starting with a most-heavily downsampled image, estimating blurriness of the downsampled images and the source image by:
        estimating blurriness of each block of a current image, when a block of a current image is estimated to be blurry:
            designating the block of the current image as blurry,
            designating co-located blocks of higher resolution image(s) as blurry; and
        computing a blurriness score for the source image from a number of blocks of the source image designated as blurry.

2. The method of claim 1 further comprising, classifying the source image as a key image from among a plurality of other images based on the source image's blurriness score.

3. The method of claim 1 further comprising:
    comparing the blurriness score to a threshold and
    classifying the source image as one of blurry and not blurry based on the comparison.

4. The method of claim 1 further comprising:
    repeating the method for a plurality of source images, and
    estimating a least blurry source image based on respective blurriness scores of the plurality of source images.

5. The method of claim 4, wherein the plurality of source images are members of a common video sequence.

6. The method of claim 4, wherein the plurality of source images are selected by a user of a device that performs the method.

7. The method of claim 1, wherein the source image is retrieved from a memory device.

8. Non-transitory computer readable medium storing program instructions that, when executed by a processing device, causes the device to:
- downsample a source image, captured by a camera or generated by a computer, to generate at least two downsampled images at different levels of downsampling;
- parse each downsampled image into a plurality of blocks;
- starting with a most-heavily downsampled image, estimate blurriness of the downsampled images and the source image by:
  - estimating blurriness of each block of a current image, when a block of a current image is estimated to be blurry:
    - designating the block of the current image as blurry,
    - designating co-located blocks of higher resolution image(s) as blurry; and
  - compute a blurriness score for the source image from a number of blocks of the source image designated as blurry.

9. The medium of claim 8, further comprising, classifying the source image as a key image from among a plurality of other images based on the source image's blurriness score.

10. The medium of claim 8, further comprising:
- comparing the blurriness score to a threshold and
- classifying the source image as one of blurry and not blurry based on the comparison.

11. The medium of claim 8, further comprising:
- repeating the method for a plurality of source images, and
- estimating a least blurry source image based on respective blurriness scores of the plurality of source images.

12. The medium of claim 8, wherein the source image is retrieved from the computer readable medium.

13. Apparatus, comprising:
- a processor and a memory,
- the processor configured by program instructions stored in the memory to operate as a downsampler, and a sharpness analyzer,
- the downsampler generating at least a pair of downsampled images from a source image, captured by a camera or generated by a computer, at two downsampled resolutions,
- the sharpness analyzer estimating blurriness of the downsampled images and the source image by estimating blurriness of each block of a current image and, when a block of a current image is estimated to be blurry, designating the block of the current image and co-located blocks of higher resolution image(s) as blurry, and compute a blurriness score for the source image from a number of blocks of the source image designated as blurry.

14. The apparatus of claim 13, wherein the sharpness analyzer is a neural network.

15. The apparatus of claim 14, wherein the neural network is trained from training images blended with blur kernels.

16. The apparatus of claim 14, wherein the neural network is trained from training images blended with simulated sensor noise.

17. The apparatus of claim 13, wherein the processor classifies the source image as a key image from among a plurality of other images based on the source image's blurriness score.

18. The apparatus of claim 13, wherein the processor:
- compares the blurriness score to a threshold and
- classifies the source image as one of blurry and not blurry based on the comparison.

19. The apparatus of claim 13, wherein the source image is part of a video sequence.

20. The apparatus of claim 13, wherein the source image is selected by a user of the apparatus.

21. The apparatus of claim 13, further comprising a camera having an output for the source image.

22. The apparatus of claim 13, wherein the source image stored in the memory prior to processing by the processor.

* * * * *